Earl D. Clark
Reuben A. Stubberfield
INVENTORS

United States Patent Office 2,935,776
Patented May 10, 1960

2,935,776

CABLE SHACKLE

Earl D. Clark and Reuben A. Stubberfield, Willits, Calif.

Application February 2, 1959, Serial No. 790,709

4 Claims. (Cl. 24—122.6)

This invention relates to a clamp for holding the end of a cable and the like. The clamp is constructed so as to firmly grip a cable end and to hold this end while the cable undergoes tensioning.

Generally, it is an object of the invention to provide such a clamp for a cable that features an improved construction which facilitates mounting of a cable end in the clamp, and which accommodates movement of the various parts in the clamp into a holding position with the cable strands with the parts tending smoothly to reach a position of mutually complementary alignment. A related object is to produce a clamp wherein maximum clamping pressure is obtained in the clamp.

In general terms, the cable clamp of this invention comprises a socket or ferrule member which has extending through the center thereof an elongated, conically tapered recess. Adapted to seat within this recess is a core portion shaped as a conico-frustum and adapted to be wedged into the aforementioned recess. The core portion has extending along the center thereof an elongated bore, which is provided for gripping onto the center core strand of the usual cable. The usual convolute strands of a cable which wind helically about the core strand are received in helical grooves which are provided in the periphery of the core portion. The grooves on the periphery of the core portion are only partially as deep as the diameter of the convolute cable strands, and thus when the core portion is wedged into the recess of the ferrule member, the convolute strands are held firmly.

The core portion of the invention comprises plural and materially complementary wedge pieces. Thus the core portion is split along its length and between its ends. By utilizing plural pieces, the core portion may be disassembled and readily mounted about the center core strand of a cable.

The wedge pieces or wedge elements which together make up the core portion when assembled have adjacent, cooperating faces defining an interface between the wedge pieces. These adjacent faces are formed upon a helical curve which substantially parallels the curvature of the external grooves in the periphery of the core portion. The edges of these helically formed faces, where they join with the periphery of the core, are disposed along lands present in the core periphery which separate the external grooves of the core portion. Preferably these edges are positioned centrally of the lands.

The adjacent faces are positioned relative to the external grooves in such a manner that when the wedge pieces or elements which make up the core portion are assembled together and aligned, the helical grooves formed in the peripheries of the various wedge pieces are disposed about the core portion as a whole in a symmetrical manner. Each groove lies wholly on the outer surface of a single wedge piece. Thus when a cable end is held, there is absent any crossover of a cable strand from the surface of one wedge piece to the surface of an adjacent wedge piece.

The construction hereinabove briefly described has several advantages. The wedge pieces making up the core are readily assembled with the center core and convolute strands of a cable merely by separating the pieces, placing the center strand in proper position, bringing together the pieces and putting each convolute cable strand in one of the external core grooves. Since the grooves are all continuous and each extends without interruption over a single wedge piece, the construction eliminates the need for mating together portions of a groove defined by more than one wedge piece. Once assembled, the wedge pieces automatically tend to bring themselves into proper aligned relationship. When the core is drawn into the recess of the ferrule by tensioning of a mounted cable end, strands of the cable, by reason of the tensioning and through engagement with the inner recess wall of the ferrule, tend to contract about the core pieces and bring them tightly together. Most important, the inherent twist of the convolute strands and the tendency of the strands to assume a symmetrical interrelationship with each other produce a natural alignment action in the wedges. This follows from the presence of the helical interface between the wedge pieces and its relationship to the external core grooves. And in view of the absence of any strand crossing from the periphery of one wedge piece to another, when the core portion is finally drawn into seating engagement with the ferrule, tightening together of the core pieces occurs smoothly and evenly and without impairment.

The invention is described hereinbelow in conjunction with the accompanying drawings wherein.

Figure 1:
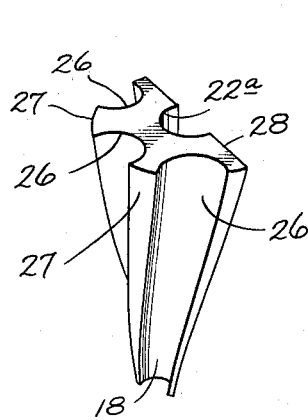
Fig. 1 illustrates in an embodiment of the invention one of the wedge pieces or elements which makes up the core portion of the clamp.

Referring now to the drawings wherein a specific embodiment of the invention is illustrated, 10 indicates a ferrule or socket member for the clamp and 11 indicates generally a core portion which cooperates with socket 10 in holding the end of a suitably mounted cable.

Considering first socket member 10, the member shown is substantially cylindrical in shape, although other shapes may be used depending upon how the socket itself is to be mounted. In practice, the socket member may be secured to some supporting structure, so that the socket may form an anchor for a cable.

Extending along the axial center of the socket member is a conically tapered recess 16. The wall portions defining the recess are smooth. When a cable is pulled downwardly into the interior of the socket member, the smooth wall portions slide against the outer convolute strands of the cable, and through their convergence, bring these strands together. The wall portions, since they are smooth, accommodate twisting of the strands as they are brought together, and sliding of the strands downwardly through the ferrule.

Figure 2:
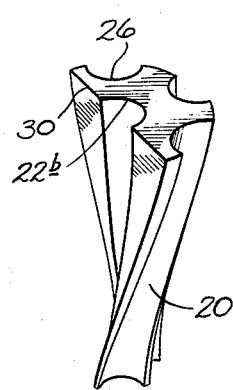
Fig. 2 illustrates a wedge piece or element complementary to the wedge element or piece of Fig. 1.
Figure 3:
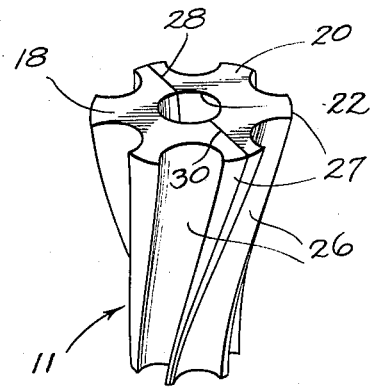
Fig. 3 shows the wedge pieces or elements of Figs. 1 and 2 assembled together and defining a core portion.

Core portion 11, which is adapted to be seated in recess 16, has a conico-frustum outline, which complements the outline of recess 16. This is best illustrated in Fig. 3. The core portion is split in the direction of its center axis, and thus comprises plural and separate and materially complementary wedge pieces or elements 18 and 20. These are shown individually in Figs. 1 and 2.

Extending along the axial center of the core portion is an elongated bore 22. This bore is adapted to receive the center core strand of the usual cable. Bore 22 is defined by elongated grooves 22a and 22b in pieces 18, 20.

Grooves 22a and 22b define a bore of a diameter which is somewhat less than the diameter of the cable center strand. Thus when the core pieces are brought together, the walls of the grooves tightly clamp against the periphery of this center strand.

Over the outer surface of the core portion and extending in the direction of its center axis are plural, elongated helical grooves 26. These wind about the periphery of the core portion and are adapted to receive the convolute strands of a cable. Since the grooves have a helical twist, the strands of the cable need not be straightened appreciably to place them in these grooves. It is preferable that the twist of the grooves be somewhat less than the twist of the convolute cable strands, as this will cause the cable strands themselves on tending to regain their original position to bring wedge pieces 18, 20 together. Grooves 26 are separated by lands 27.

Wedge piece 18 and wedge piece 20 terminate along their inner sides in complementary faces 28, 30. These faces have a helical twist which substantially parallels the helical curve of grooves 26. The edges of these faces meet with the periphery of the core in the area where lands 27 are located. Thus the parts lines at the surface of the core extend along lands 27, and centrally of the lands.

Figure 4:
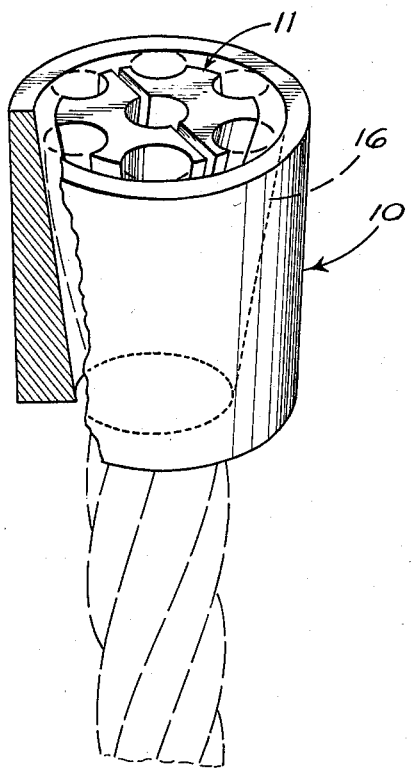
Fig. 4 shows a complete cable clamp, with the strands of a cable end positioned in the clamp and indicated in dotted outline.

In mounting the end of a cable in the clamp described, the outer convolute strands of the cable are separated, and the center core strand placed in bore 22 (which is first opened up by separating wedge pieces 18, 20). With the center strand so placed and the wedge pieces brought together, the convolute windings of the cable are easily placed into grooves 26. The resiliency of the convolute strands tends to draw together the wedge pieces so that they approach the condition shown in Figs. 3 and 4.

Since the helical grooves formed in the periphery of the core piece are symmetrically arranged around its periphery on final assembly of the core, and since with the core pieces aligned twisting faces 28, 30 fit snugly with each other only when a symmetrical arrangement is obtained, the twist inherent in the convolute strands of a cable tends to position properly the core pieces as they are moved into clamping position. This alignment action also takes place when the cable end is pulled downwardly in the ferrule, as this functions to bring together the outer convolute strands which is also accompanied by some turning of these strands.

It will be noted that each helical, external groove is completely contained on a single wedge or core piece. This has the effect of enabling easier placement of the convolute strands in the grooves. It also makes possible better clamping action in the wedge pieces. If a mounted strand were to extend over adjacent wedge pieces, the presence of this strand would tend to hold the wedge elements apart. Further, a stressed condition develops in the clamp. The several portions of any groove partially defined by plural wedge pieces would only be truly aligned with each other for a given spaced-apart relation of the wedge pieces. Vary this spaced-apart relation, and misalignment of the groove portions results. Obviously the spacing apart of the wedge pieces is not constant in a clamp. This type of condition is completely eliminated using the spiral twist of the interfaces indicated.

It is claimed and desired to secure by Letters Patent:

1. A clamp for cables and the like comprising a socket member having a conically tapered recess extending therethrough and an inner core portion of substantially conico-frustum outline and split in the direction of its longitudinal center axis and thus comprising plural and separate and materially complementary wedge pieces, said inner core portion being adapted to seat in said recess while clamping onto the strands of such a cable, said core portion having an elongated bore extending substantially along its longitudinal center axis adapted to receive the center strand of such a cable and plural helically formed external grooves extending in the direction of its longitudinal center axis formed in the periphery thereof, said wedge pieces having adjacent faces defining a parting line between adjacent wedge pieces which is formed upon a helical curve which substantially parallels the curvature of the external grooves.

2. A clamp for cables and the like comprising a socket member having a conically tapered recess extending therethrough and an inner core portion of substantially conico-frustum outline and split in the direction of its longitudinal center axis and thus comprising plural and separate and materially complementary wedge pieces, said inner core portion being adapted to seat in said recess while clamping onto the strands of such a cable, said core portion having an elongated bore extending substantially along its longitudinal center axis adapted to receive the center strand of such a cable and plural, helically formed external grooves extending in the direction of its longitudinal center axis formed in the periphery thereof, said grooves being separated by helical lands, said wedge pieces being separated by interfaces which meet the periphery of the core portion along lines which substantially parallel the curve of the external grooves and which are located along a portion of the lands separating the grooves.

3. A clamp for cables and the like comprising a socket member having a conically tapered recess extending therethrough and an inner core portion of substantially conico-frustum outline split in the direction of its longitudinal center axis and thus comprising plural and separate and materially complementary wedge pieces, said inner core portion being adapted to seat in said recess while clamping onto the strands of such a cable, these being an elongated bore extending substantially along the longitudinal center axis of the core portion and adapted to be opened up by division of the wedge pieces, said bore being adapted to receive the center strand of such a cable, plural helically formed external grooves formed in the periphery of the core portion extending in the direction of the longitudinal center axis of the core portion, said grooves being separated by helical lands intermediate the grooves which taper between their ends from the end of the core portion of larger diameter to the end of the core portion of smaller diameter, said wedge pieces being separated by interfaces which meet the periphery of the core portion along lines which substantially parallel the curve of the external grooves and which are located along a portion of the lands separating the grooves centrally of the lands.

4. In a clamp for cables and the like having a socket member with a conico-frustum shaped bore extending through the center thereof and a pair of complementary wedge pieces adapted to be fitted together and when fitted together defining a conico-frustum shaped core portion for the socket member, said wedge pieces having along their inner faces an elongated groove adapted to receive the center strand of such a cable and formed in their periphery elongated helical grooves separated by helical lands for the reception of the convolute strands of such a cable, the improvement comprising the provision of mutually adjacent faces for the wedge pieces which are formed upon a helical curve substantially paralleling the curvature of the helical grooves, the faces meeting with the periphery of the core portion along a portion of the lands which separate the grooves.

References Cited in the file of this patent

UNITED STATES PATENTS

| | | |
|---|---|---|
| 985,915 | Marchand | Mar. 7, 1911 |
| 2,341,922 | King et al. | Feb. 15, 1944 |
| 2,856,662 | Clark et al. | Oct. 21, 1958 |